United States Patent
Lee et al.

(10) Patent No.: US 8,824,820 B2
(45) Date of Patent: Sep. 2, 2014

(54) METHOD AND APPARATUS FOR PROVIDING AND REPRODUCING THREE-DIMENSIONAL VIDEO CONTENT AND RECORDING MEDIUM THEREOF

(75) Inventors: Jae-jun Lee, Suwon-si (KR); Yong-tae Kim, Seoul (KR); Seong-sin Joo, Suwon-si (KR); Jae-seung Kim, Yongin-si (KR); Yong-seok Jang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 697 days.

(21) Appl. No.: 12/271,098

(22) Filed: Nov. 14, 2008

(65) Prior Publication Data

US 2009/0245347 A1    Oct. 1, 2009

(30) Foreign Application Priority Data

Mar. 25, 2008   (KR) ......................... 10-2008-0027365

(51) Int. Cl.
*H04N 9/80*    (2006.01)
*H04N 13/00*   (2006.01)

(52) U.S. Cl.
CPC ....... *H04N 13/0066* (2013.01); *H04N 13/0048* (2013.01)
USPC .......... 382/248; 375/240.01; 345/419; 348/43

(58) Field of Classification Search
USPC .......... 375/240.01–240.29; 348/E13.062, 43; 725/95; 386/248; 345/419
See application file for complete search history.

(56) References Cited

U.S. PATENT DOCUMENTS

| | | | |
|---|---|---|---|
| 2003/0208768 A1* | 11/2003 | Urdang et al. | 725/95 |
| 2005/0175098 A1* | 8/2005 | Narasimhan et al. | 375/240.12 |
| 2005/0283802 A1* | 12/2005 | Corl | 725/45 |
| 2007/0002041 A1* | 1/2007 | Kim et al. | 345/419 |
| 2008/0310499 A1 | 12/2008 | Kim et al. | |
| 2010/0182403 A1 | 7/2010 | Chun et al. | |

FOREIGN PATENT DOCUMENTS

| | | | |
|---|---|---|---|
| KR | 10-1999-0060127 A | 7/1999 | |
| KR | 10-2003-0029649 A | 4/2003 | |
| KR | 10-2005-0111379 A | 11/2005 | |

(Continued)

OTHER PUBLICATIONS

Communication dated Feb. 15, 2012 issued by the European Patent Office in European Application No. 08873628.5.

(Continued)

*Primary Examiner* — Sath V Perungavoor
*Assistant Examiner* — Nathnael Aynalem
(74) *Attorney, Agent, or Firm* — Sughrue Mion, PLLC

(57) ABSTRACT

Provided are a method and apparatus for providing and reproducing a three-dimensional (3D) video content, and a computer readable recording medium storing a program to execute the method. The method of providing 3D image content includes: inserting content type information indicating whether the image content is two-dimensional (2D) image content or 3D image content into a reserved region of a Program Map Table (PMT); inserting additional information about the 3D image content into one of an Elementary Stream (ES) descriptor region of the PMT and a reserved region included in a video sequence of the ES; and multiplexing the PMT and the ES of the 3D image content so as to generate a Transport Stream (TS). Accordingly, compatibility with a conventional digital broadcasting system can be maintained and more realistic 3D image content can be provided to a user.

7 Claims, 7 Drawing Sheets

(56) References Cited

FOREIGN PATENT DOCUMENTS

KR          10-0716142 B1     5/2007
KR       10-2007-0058302 A    6/2007
KR       10-2007-0061227 A    6/2007
WO        WO 2007064159 A1 *  6/2007

OTHER PUBLICATIONS

Anonymous: "Transmission of Non-Telephone Signals," Information Technology—Generic Coding of Moving Pictures and Associated Audio Information: Systems, ITU-T Recommendation H.222.0, No. H.222.0, Jul. 1, 1995, 135 pages, XP007920212.

Communication dated Dec. 11, 2012 from the Chinese Intellectual Property Office in a counterpart application No. 200880125196.X.
Communication, dated Aug. 2, 2013, issued by the State Intellectual Property Office of the People's Republic of China in counterpart Chinese Application No. 200880125196.X.
Communication, dated Dec. 19, 2013, issued by the Korean Intellectual Property Office in counterpart Korean Application No. 10-2008-0027365.
Communication dated Jun. 25, 2014, issued by the Korean Intellectual Property Office in counterpart Korean Application No. 10-2008-0027365.

* cited by examiner

METHOD AND APPARATUS FOR PROVIDING AND REPRODUCING THREE-DIMENSIONAL VIDEO CONTENT AND RECORDING MEDIUM THEREOF

CROSS-REFERENCE TO RELATED PATENT APPLICATION

This application claims the benefit of Korean Patent Application No. 10-2008-0027365, filed on Mar. 25, 2008, in the Korean Intellectual Property Office, the disclosure of which is incorporated herein in its entirety by reference.

BACKGROUND OF THE INVENTION

1. Field of the Invention

Methods and apparatuses consistent with the present invention relate to a three-dimensional (3D) video content service, and more particularly, to a method and apparatus for providing and reproducing 3D video content that can maintain compatibility with a conventional digital broadcasting system, along with providing more realistic 3D video content to a user by using a Program Map Table (PMT) and an Elementary Stream (ES) for transmitting 3D video content, and a computer readable recording medium storing a program to execute the method.

2. Description of the Related Art

Currently, research into three-dimensional (3D) images such as stereoscopic images has been carried out in relation to Digital Televisions (DTVs). The DTVs convert analog signals of video, audio, and other data into digital signals and compress and transmit the digital signals. Then, the DTVs receive the digital signals again to convert the digital signals back into the original video, audio, and other data signals and reproduces the respective content, thereby providing a high-definition service, compared with conventional analog broadcasting.

FIG. 1 is a block diagram of a conventional apparatus for generating a transport stream (TS) of a 3D image.

Referring to FIG. 1, encoders 104 and 106 separately encode a two-dimensional (2D) image and 3D additional information received from a 3D audio visual (AV) acquisition unit 102 and generate ESs for the 2D image and the 3D additional information. Packetizers 108 and 110 respectively packetize the ES of 2D image and the ES of the 3D information, generated by the encoders 104 and 106. A Program Specific Information (PSI) generator 112 generates PSI for a system decoder to decode the content existing in the TS. The PSI includes a Program Association Table (PAT) and a Program Map Table (PMT). TS packet generators 114, 116, and 118 generate TSs for the ES packetized in the packetizers 108 and 110 and the PSI information generated from the PSI generator 112. A multiplexer (MUX) 120 multiplexes the TSs generated by the TS generators 114, 116, and 118.

However, according to the conventional art, the structure of the conventional PMT should be changed to provide additional information about the 3D image content and thus, the conventional apparatus cannot maintain compatibility with conventional analog broadcasting.

SUMMARY OF THE INVENTION

The present invention provides a method and apparatus for providing and reproducing three-dimensional (3D) video content that can maintain compatibility with a conventional digital broadcasting system, along with providing more realistic 3D video content to a user, and a computer readable recording medium storing a program to execute the method.

According to an aspect of the present invention, there is provided a method of providing three-dimensional (3D) image content, the method including: inserting content type information indicating whether image content is two-dimensional (2D) image content or 3D image content into a reserved region of a Program Map Table (PMT); inserting additional information about the 3D image content into one of an Elementary Stream (ES) descriptor region of the PMT and a reserved region included in a video sequence of an ES; and multiplexing the PMT and the ES of the 3D image content so as to generate a Transport Stream (TS).

The method may further include inserting another additional information about the 3D image content into the reserved region included in the video sequence of the ES.

The reserved region included in the video sequence of the ES may include at least one of a user data region and a sequence extension region located in a header of the ES, and a picture coding extension region located in a picture header of the ES, in a case of the MPEG-2 standard.

The reserved region included in the video sequence of the ES may include at least one of a sequence parameter set region, a Supplemental Enhancement Information (SEI) region, and a picture parameter set region located in the header of the ES, in a case of the H.264/AVC standard.

The content type information may indicate whether image content is 2D image content or 3D image content, or content mixed with 2D image and 3D image.

The additional information about the 3D image content may include reference image information indicating whether the 3D image content is reference image view content or additional image view content.

The additional information about the 3D image content may include multi-view mode information indicating whether the 3D image content is multi-view mode image content.

The another additional information about the 3D image content may include information relating to an image view of the 3D image content for a multi-view mode image.

The another additional information about the 3D image content may include information about a format of the 3D image content, the format of the 3D image content comprising at least one of a side by side image, a top and bottom image, a frame sequential image, a field sequential image, and a depth image.

The another additional information about the 3D image content may include information about camera parameters of the 3D image content.

The another additional information about the 3D image content may include information about an optimal display size or an optimal viewing distance of the 3D image content The another additional information about the 3D image content may include a 3D start flag and a 3D end flag for local 3D image content.

According to another aspect of the present invention, there is provided a method of reproducing 3D image content, the method including: extracting a Program Map Table (PMT) from a Transport Stream (TS); determining whether image content included in the TS is 2D image content or 3D image content by using content type information inserted into a reserved region of the PMT; extracting an Elementary Stream (ES) of the 3D image content from the TS; and extracting additional information about the 3D image content from an ES descriptor region of the PMT or a reserved region included in a video sequence of the ES.

The method may further include extracting another additional information about the 3D image content inserted into the reserved region included in the video sequence of the ES.

The method may further include reproducing the 3D image content by using the additional information about the 3D image content and another additional information about the 3D image content.

According to another aspect of the present invention, there is provided an apparatus for providing 3D image content, the apparatus including: a content type information inserting unit which inserts content type information indicating whether image content is 2D image content or 3D image content into a reserved region of a Program Map Table (PMT); an additional information inserting unit which inserts additional information about the 3D image content into one of an Elementary Stream (ES) descriptor region of the PMT and a reserved region included in a video sequence of an ES; and a Transport Stream (TS) generating unit which multiplexes the PMT and the ES of the 3D image content so as to generate a TS.

According to another aspect of the present invention, there is provided an apparatus for reproducing 3D image content, the apparatus including: a Program Map Table (PMT) extracting unit which extracts a PMT from a Transport Stream (TS); a content type determining unit which determines whether image content included in the TS is 2D image content or 3D image content by using content type information inserted into a reserved region of the PMT; and an additional information extracting unit which extracts additional information about the 3D image content from an Elementary Stream (ES) descriptor region of the PMT or a reserved region included in a video sequence of the ES.

According to another aspect of the present invention, there is provided a computer readable recording medium having embodied thereon a computer program for executing a method of providing 3D image content, the method including: inserting content type information indicating whether image content is 2D image content or 3D image content into a reserved region of a Program Map Table (PMT); inserting additional information about the 3D image content into one of an Elementary Stream (ES) descriptor region of the PMT and a reserved region included in a video sequence of an ES; and multiplexing the PMT and the ES of the 3D image content so as to generate a Transport Stream (TS).

According to another aspect of the present invention, there is provided computer readable recording medium having embodied thereon a computer program for executing the method of reproducing 3D image content, the method including: extracting a Program Map Table (PMT) from a Transport Stream (TS); determining whether image content included in the TS is 2D image content or 3D image content by using content type information inserted into a reserved region of the PMT; and extracting additional information about the 3D image content from an ES descriptor region of the PMT or a reserved region included in a video sequence of an ES.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown.

Program Specific Information (PSI) is information defined by a user for a system decoder to decode content existing in a transport stream (TS) and generally includes four tables such as a Program Association Table (PAT), a Program Map Table (PMT), a Network Information Table (NIT), and a Conditional Access Table (CAT).

The PAT and the PMT are related to program information for configuring the program, the NIT is related to delivery network information, and the CAT is related to scrambling in the case of conditional receiving. The present invention is related to the PAT and the PMT. One embodiment of the invention does not consider the NIT and the CAT. In addition, a Process Identifier (PID) denotes a packet identifier located in a packet header of the TS. The PID is used to classify the packet of the TS in a reception terminal of the TS. That is, the apparatus for generating the three-dimensional (3D) image content according to the present invention initializes a content service from the PAT.

Figure 2:
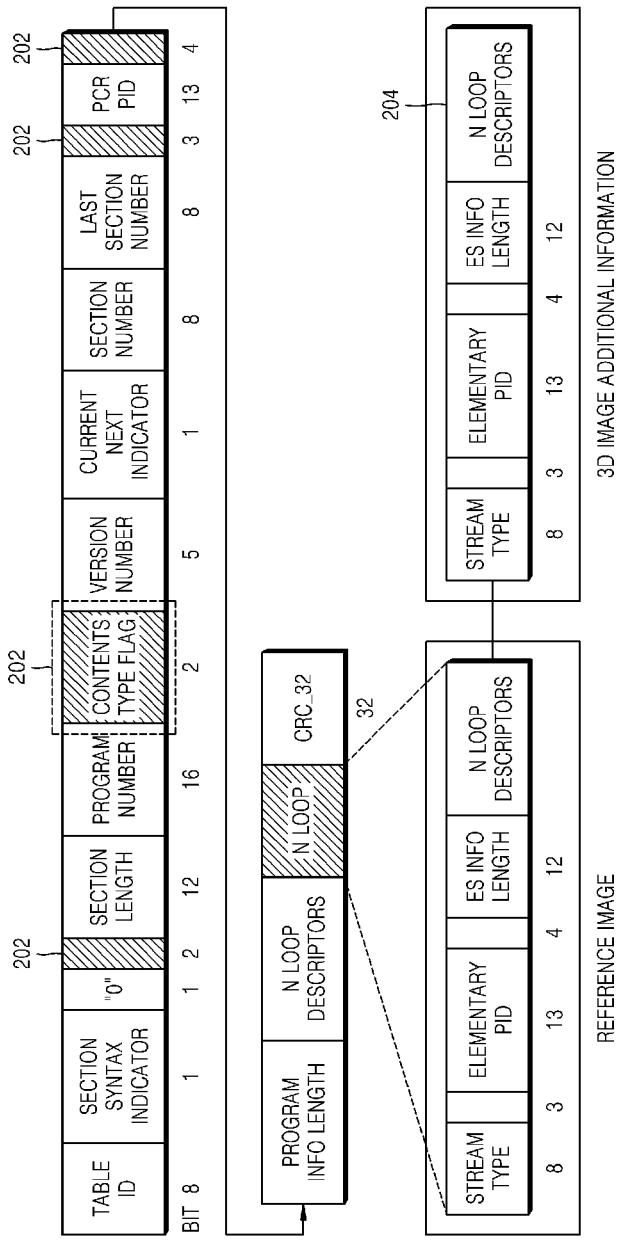
FIG. 2 is a diagram illustrating a structure of a Program Map Table (PMT) for executing a method of providing and reproducing 3D image content, according to an embodiment of the present invention.

FIG. 2 is a diagram illustrating the structure of a PMT for executing a method of providing and reproducing 3D image content, according to an embodiment of the present invention.

Referring to FIG. 2, the structure of the PMT according to the current embodiment is based on the MPEG-2 standard and includes reserved regions 202. For example, the reserved regions 202 in the PMT are respectively located in front of a section length region, a version number region, a Program Clock Reference Packet ID (PCR PID), and a program info length region.

The reserved region 202 in the PMT includes content type information contents_type_flag indicating whether the image content included in the MPEG-2 TS is two-dimensional (2D) image content or the 3D image content. Table 1 below represents examples of the content type information.

TABLE 1

| value | Content type |
|-------|--------------|
| 0x00  | 2D |
| 0x01  | 3D (Stereoscopy) |
| 0x10  | 2D/3D Mixed |
| 0x11  | reserved |

For example, when the content type information has the values of "0x00", "0x00", and "0x10", the image content included in the TS may be respectively the 2D image content, the 3D image content, and content in which a 2D image and a 3D image are mixed (that is, local 3D image content). The values of "0x11" may be designated as a reserved value.

In addition, an Elementary Stream (ES) descriptor of the PMT may include additional information about the 3D image content (that is, first additional information). For example, an N Loop descriptor 204 may include an additional information descriptor on the 3D image content, 3D_data_indicator_descriptor. Table 2 below represents examples of 3D_data_indicator_descriptor included in the N Loop descriptor 204.

TABLE 2

| 3D_data_indicator_descriptor | |
|---|---|
| Descriptor tag | unsigned int(8) |
| Descriptor length | unsigned int(8) |
| Reference image (main_view) information | unsigned int(1) |
| Multi-view mode (multi_view) information | unsigned int(1) |
| reserved | |

In table 2, the first additional information about the 3D image content may include the reference image information and the multi-view information. The reference image information is information indicating whether the image content is reference image view content or additional image view content. The multi-view mode information may be information indicating whether the image content is multi-view mode image content.

For example, when the reference image information has the value of "0" and "1", the image content included in the TS may be respectively the reference image view content and the 3D additional image view content. Also, when the multi-view mode information has the value of "1", the image content included in the TS may be the multi-view image content.

In addition, the reference image information and the multi-view mode information may be included in the reserved region, a GOP header, or a picture header of currently used descriptor.

Moreover, the reserved region included in a video sequence of the ES may include another additional information about the 3D image content (that is, second additional information). For example, in the case of the MPEG-2 standard, the reserved region in the video sequence of the ES may be a user data region and a sequence extension region located in a header of the ES, and a picture coding extension region located in a picture header of the ES. Also, in the case of the H.264/AVC standard, the reserved region in the video sequence of the ES may be a sequence parameter set region, a Supplemental Enhancement Information (SEI) region, and a picture parameter set region located in the header of the ES.

Figure 3:
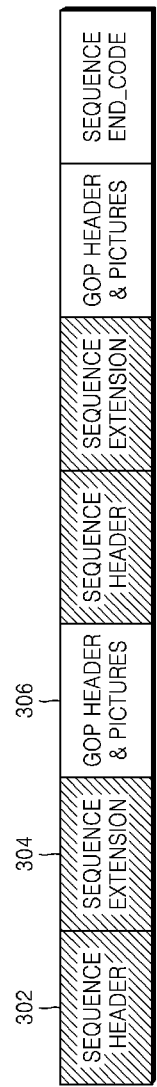
FIG. 3 illustrates an MPEG-2 video structure for explaining a method of inserting additional information about 3D image content in the MPEG-2 standard.

FIG. 3 illustrates an MPEG-2 video structure for explaining a method of inserting additional information about the 3D image content in the MPEG-2 standard. The MPEG-2 video hierarchical structure illustrated in FIG. 3 includes a sequence header region 302, a sequence extension region 304, Group of Pictures (GOP) header and pictures 306, and a sequence end code region. The additional information about the 3D image content may be inserted into a user data region of the sequence header region 302, the sequence extension region 304, and a picture coding extension region located in the picture header of the GOP. In particular, when the additional information is inserted into the sequence extension region 304 and the picture coding extension region, 3D additional information extensions, sequence_3D_extension, with respect to the additional information about the 3D image content is defined in the reserved region that is defined in an extension start code identifier. Then, the additional information about the 3D image content may be inserted into the sequence_3D_extension. In addition, sequence_3D_extension may be defined in the user data region.

Figure 4:
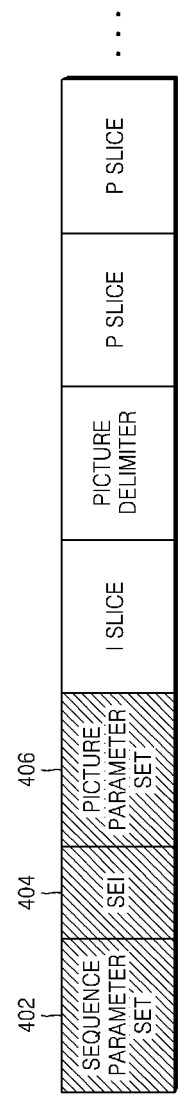
FIG. 4 illustrates an H.264/AVC video structure for explaining a method of inserting additional information about 3D image content in the H.264/AVC standard.

FIG. 4 illustrates an H.264/AVC video structure for explaining a method of inserting additional information about the 3D image content in the H.264/AVC standard. The H.264 RSBP illustrated in FIG. 4 includes a sequence parameter set region 402, a SEI region 404, and a video parameter set (or picture parameter set) region 406. The additional information about the 3D image content may be used by defining sequence_3D_extension in the reserved region of the regions 402, 404, and 406.

Table 3-1 below represents examples of the additional information about the 3D image content included in sequence_3D_extension.

TABLE 3-1

| sequence_3D_extension ( ) { | |
|---|---|
| extension_start_code_Identifier | unsigned int(4) |
| if(contents_type=='10'){ | |
|    3D_start_flag | unsigned int(1) |
|    3D_end_flag | unsigned int(1) |
| } | |
| multiview flag | unsigned int(1) |
| if(multiview_flag=='1'){ | |
|    view_ordering | unsigned int(1) |
|    main_view | unsigned int(1) |
|    multiview_index | unsigned int(6) |
| } | |
| reserved | |
| Format_flag | unsigned int(1) |
| if(Format_flag =='1'){ | |
| 3D_Data_Format | unsigned int(4) |
| if(depth=='1'){ | |
|    max_depth | unsigned int(32) |
|    min_depth | unsigned int(32) |
| } | |
| } | |
| Display_flag | unsigned int(1) |
| if(Display_flag=='1'){ | |
| OptimalDisplayWidth | unsigned int(32) |
| OptimalDisplayHeight | unsigned int(32) |
| OptimalViewingDistance | unsigned int(16) |
| } | |
| CamParams_flag | unsigned int(1) |
| if(CamParams_flag=='1'){ | |
|    translation[3] | unsigned int(32) |
|    focallength | unsigned int(31) |
|    center_point[2] | unsigned int(32) |
|      Is_Cam_Cross | unsigned int(1) |
|      if(Is_Cam_Cross=='1') | |
| { | |
|      rotation[3] | unsigned int(32) |
|    } | |
| } | |
| } | |

In the table 3-1, when the content type is the content in which the 2D image and the 3D image are mixed (that is, the local 3D image content), sequence_3D_extension may include a 3D start flag, 3D_start_flag, which indicates the starting time of the 3D image content and a 3D end flag, 3D_end_flag, which indicates the end time of the 3D image content.

As another method of representing a 3D section, the 3D_start_flag is set to '1' at the starting point and 3D_end_flag is set to '1' at the end point in the table 3-1, thereby setting the 3D section. However, instead of the method of representing the starting point and the end point in driving a 3D display, the number of the 3D sections may be directly marked to the starting point so as to facilitate the operation of a counter (a device for counting the number of sections of the 3D mode).

In addition, when the image content is the multi-view mode content, sequence_3D_extension may include orders of each view in the multi-view mode (view_ordering), reference image view (main_view), and multi-view index (multiview_index).

view_ordering indicates the arrangement orders of the multi-view images. For example, when view_ordering is 1, the image having multiview_index of 0 (the minimum value) becomes the leftmost view and the image having the multiview_index of the maximum value becomes the rightmost view.

When view_ordering is 0, the image having the multiview_index of 0 (the minimum value) becomes the rightmost view and the image having the multiview_index of the maximum value becomes the leftmost value. Of course, the above example may be vice versa.

main_view indicates whether the current view is the reference view image. main_view may have various meanings in that it can be used as the standard view in a Model-View-Controller (MVC) or it can only refer to its own view without disparity estimation using other views so that separate decoding is possible.

The value of multiview_index is determined according to view_ordering. The images are arranged from left to right and the value of multiview_index is determined in an ascending order or descending order according to view_ordering.

In addition, sequence_3D_extension may include depth image information which indicates whether the image content is depth image content. For example, when the depth image information has the value of "1", it denotes that the depth image content and additional information about the depth image content are received. When the depth image information has the value of "0", it denotes that the received image content is not the depth image content. If the image content is the depth image content, the additional information about the depth image content may include the maximum distance, max_depth, and the minimum distance, min_depth, the maximum and the minimum distances being measured from a camera that photographs a predetermined object to the object.

Moreover, sequence_3D_extension may include information about the format of the 3D image content such as a side by side image, a top and bottom image, a frame sequential image, a field sequential image, and a depth image.

TABLE 3-2

| bit | | | |
|---|---|---|---|
| 3 | 2 | 1 | 0 |
| depth | size | F1 | F0 |

TABLE 3-2-continued

| bit | | | |
|---|---|---|---|
| 3 | 2 | 1 | 0 |

1. depth (disparity) information: 0 = normal image, 1 = depth image
2. Size information: 0 = Full image, 1 = Half image
3. Format information: F0-F1
   00: side by side image
   01: top and bottom image
   10: frame sequential image
   11: field sequential image For example, when information about the 3D image content format has the values of "0100", "0101", "0010", and "0011", it may respectively indicate half image data with a side-by-side format, half image data with a top-bottom format, full image data with a frame sequential format, and full image data with a field sequential format.

In addition, sequence_3D_extension may include an optimal display size capable of optimally displaying the 3D image content (for example, Optimal Display Width and Optimal Display Height) and an Optimal Viewing Distance capable of optimally viewing the contents for a user.

Moreover, sequence_3D_extension may include camera parameter information indicating whether the image content includes the camera parameters. For example, when the camera parameter information has the value of "1", it may indicate that the image content including the camera parameters and camera parameter related additional information are received. When the camera parameter information has the value of "0", it may indicate that the image content does not include the camera parameters.

If the image content includes the camera parameters, the camera parameter related additional information may include a translation parameter, a rotation parameter, a focal length parameter, and a center point parameter. Here, the translation parameter is a difference vector between the left view point and the right view point from the origin. In the case of the multi-view point, the translation parameter may include three coordinate values of x, y, and z. In the case of a double-view point, the translation parameter may include only a value for a baseline distance. The rotation parameter is a 3D camera pose angle that is based on a world coordinate. In the case of the multi-view point, the rotation parameter may include three angle values of a, b, and c. The focal length parameter is a distance from an optical center to a plane of an image.

The center point parameter (center_point) is coordinate values (X, Y) indicating the point in an image through which an optical axis passes.

According to the PMT described above, the conventional apparatus for reproducing the 2D image content ignores the content type information, contents_type_flag, included in the PMT and thus the provided 2D image content can be viewed. However, the apparatus for reproducing the 3D image content according to the present invention interprets the content type information, contents_type_flag, included in the PMT so as to distinguish the 3D image content from the 2D image content and interprets the 3D additional information extension, sequence_3D_extension, defined in the ES descriptor region, 3D_data_indicator_descriptor, and the ES video sequence so as to provide a 3D image content service. When the ES descriptor region, 3D_data_indicator_descriptor, does not exist, if a plurality of ESs exists in one TS, the ES relating to the 3D image content cannot be distinguished.

In addition, in case of the 3D image content service, synchronization can be accomplished using a Program Clock Reference (PCR) or a System Clock Reference (SCR) in system headers TS/PS, a Presentation Time Stamp and a Decoding Time Stamp (DTS) in the plurality of packetized ESs (PESs), and a time code (time_code) in a GOP header. In particular, in the local 3D image content service, the start and the end of the local 3D image content can be known using a 3D start flag and a 3D end flag located in the 3D information extension.

Figure 5:
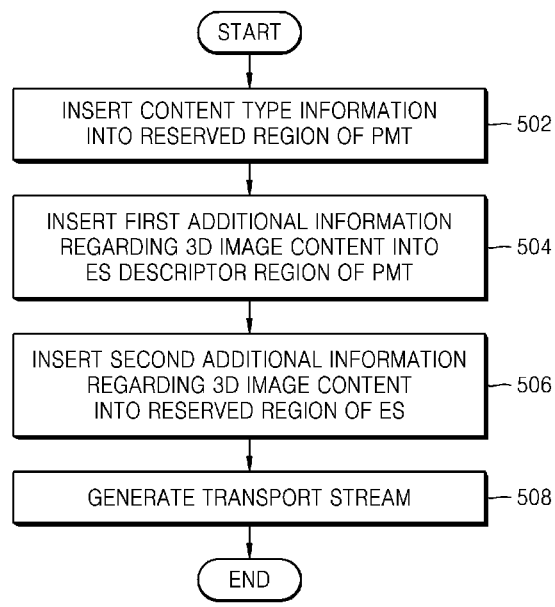
FIG. 5 is a flowchart illustrating a method of providing 3D image content according to an embodiment of the present invention.

FIG. 5 is a flowchart illustrating a method of providing the 3D image content according to an embodiment of the present invention.

Referring to FIG. 5, in operation 502, the apparatus for providing the 3D image content inserts the content type information which indicates whether the image content is the 2D image content or the 3D image content into the reserved region of the PMT.

In operation 504, the apparatus for providing the 3D image content inserts the additional information about the 3D image content (that is, the first additional information) into the ES descriptor region in the PMT. The first additional information may include the reference image information indicating whether the 3D image content is the reference image content or the additional image content and multi-view mode information indicating whether the 3D image content is the multi-view mode image content.

In operation 506, the apparatus for providing the 3D image content inserts another additional information about the 3D image content (that is, the second additional information) into the reserved region included in the video sequence of the ES. In the case of the MPEG-2 standard, the reserved region included in the video sequence of the ES may be the user data region and the sequence extension region located in the header of the ES, and the picture coding extension region located in the picture header of the ES. Also, in the case of the H.264/AVC standard, the reserved region included in the video sequence of the ES may be the sequence parameter set region, the SEI region, and the picture parameter set region located in the header of the ES.

In operation 508, the apparatus for providing the 3D image content multiplexes the PMT and the ES of the 3D image content so as to generate the TS. The second additional information may include information relating to an image view of the 3D image content, information relating to the display format of the 3D image content, information relating to the camera parameters of the 3D image content, information relating to the optimal display size or the optimal viewing distance of the 3D image content, and the 3D start flag and the 3D end flag for the local 3D image content.

Figure 6:
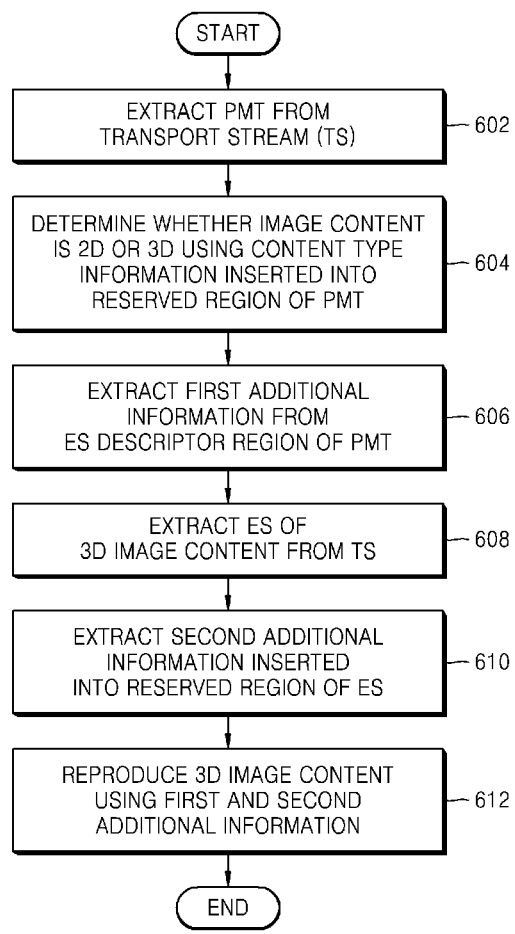
FIG. 6 is a flowchart illustrating a method of reproducing 3D image content according to an embodiment of the present invention.

FIG. 6 is a flowchart illustrating a method of reproducing the 3D image content according to an embodiment of the present invention.

Referring to FIG. 6, in operation 602, the apparatus for reproducing the 3D image content extracts the PMT from the TS.

In operation 604, the apparatus for reproducing the 3D image content determines whether the image content included in the TS is the 2D image content or the 3D image content by using the content type information inserted into the reserved region of the PMT.

In operation 606, the apparatus for reproducing the 3D image content extracts the additional information about the 3D image content (that is, the first additional information) from the ES descriptor region of the PMT. The first additional information has already been described above and thus a description thereof will be omitted here.

In operation 608, the apparatus for reproducing the 3D image content extracts the ES of the 3D image content from the TS.

In operation 610, the apparatus for reproducing the 3D image content extracts the another information about the 3D image content (that is, the second additional information) inserted into the reserved region in the video sequence of the ES. The second additional information has already been described above and thus a description thereof will be omitted here.

In operation 612, the apparatus for reproducing the 3D image content reproduces the 3D image content by using the first additional information extracted in operation 606 and the second additional information extracted in operation 610.

Figure 7:
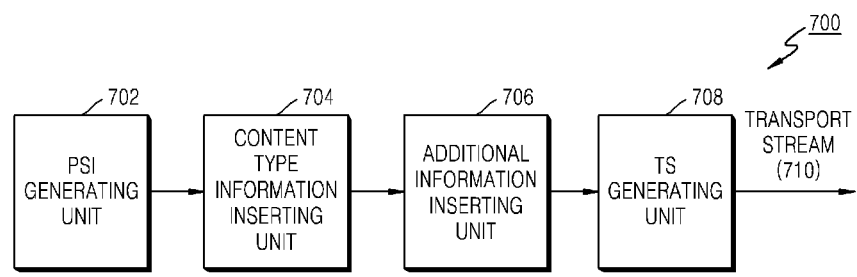
FIG. 7 is a block diagram of an apparatus for providing 3D image content according to an embodiment of the present invention.

FIG. 7 is a block diagram of the apparatus for providing the 3D image content according to an embodiment of the present invention.

Referring to FIG. 7, the apparatus for providing the 3D image content 700 includes a PSI generating unit 702, a content type information inserting unit 704, an additional information inserting unit 706, and a TS generating unit 708.

Figure 1:
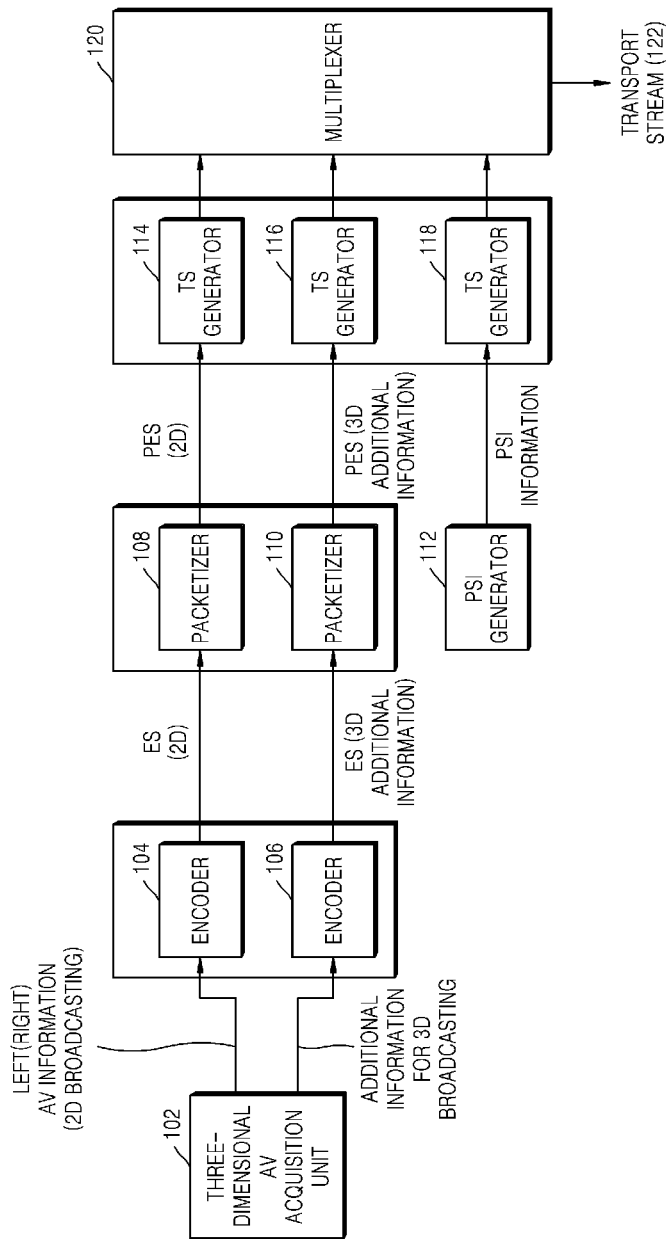
FIG. 1 is a block diagram of a conventional apparatus for generating a transport stream (TS) of a three-dimensional (3D) image.

The PSI generating unit 702 generates PSI information for the apparatus for providing the 3D image content 700 to decode the content included in the TS. The PSI generating unit 702 operates in a similar manner to the PSI generator 112 illustrated in FIG. 1 and thus a description thereof will be omitted here.

The content type information inserting unit 704 inserts the content type information indicating whether the image content is the 2D image content or the 3D image content into the reserved region of the PMT.

The additional information inserting unit 706 inserts the first additional information about the 3D image content into the ES descriptor region of the PMT. The first additional information has already been described above and thus a description thereof will be omitted here.

The TS generating unit 708 multiplexes the PMT and the ES of the 3D image content and thus generates TS 710.

Figure 8:
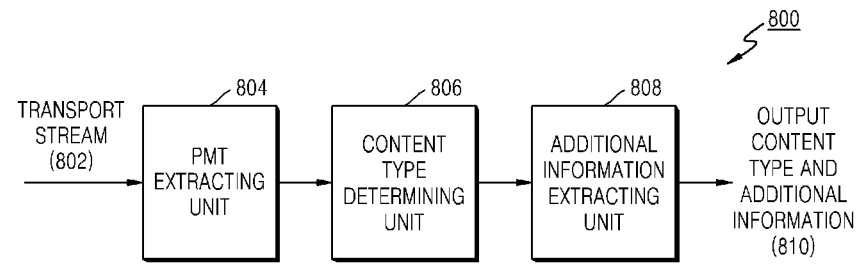
FIG. 8 is a block diagram of an apparatus for reproducing 3D image content according to an embodiment of the present invention.

FIG. 8 is a block diagram of the apparatus for reproducing the 3D image content according to an embodiment of the present invention.

The apparatus for reproducing the 3D image content 800 includes a PMT extracting unit 804, a content type determining unit 806, and an additional information extracting unit 808.

The PMT extracting unit 804 extracts the PMT from TS 802.

The content type determining unit 806 determines whether the image content included in the TS 802 is the 2D image content or the 3D image content by using the content type information inserted into the reserved region of the PMT.

The additional information extracting unit 808 extracts the additional information about the 3D image content from the ES descriptor region of the PMT. The additional information extracting unit 808 outputs the content type and additional information about the 3D image content 810.

According to the present invention, the additional information about the 3D image content is inserted into the reserved region and the ES descriptor region in the PMT, thereby preserving compatibility with the conventional digital broadcasting system, along with providing more realistic 3D image content to a user.

The present invention related to the method and apparatus for providing and reproducing 3D image content can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. In another exemplary embodiment, the computer readable recording medium may be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of reproducing three-dimensional (3D) image content, the method comprising:
   extracting a Program Map Table (PMT) from a header of a Transport Stream (TS);
   determining whether image content included in the TS is 3D image content by using content type information inserted into a descriptor region of the PMT;
   extracting an Elementary Stream (ES) of the 3D image content from the TS; and
   extracting first information about the 3D image content indicating whether the 3D image content is reference view image content or additional view image content from the PMT,
   wherein the 3D image content is determined to be ended and a 2D image content is determined to be started based on the PMT received prior to the 2D image content.

2. The method of claim 1, further comprising reproducing the 3D image content by using the first information about the 3D image content and the second information about the 3D image content.

3. The method of claim 1, wherein the first information about the 3D image content comprises multi-view mode information indicating whether the 3D image content is multi-view mode image content.

4. An apparatus for reproducing three-dimensional (3D) image content, the apparatus comprising:
   a first extracting unit which extracts a PMT from a header of a Transport Stream (TS); a determining unit which determines whether image content included in the TS is 3D image content by using content type information inserted into a descriptor region of the PMT; and
   a second extracting unit which extracts first information about the 3D image content indicating whether the 3D image content is reference view image content or additional view image content from the PMT, wherein the 3D image content is determined to be ended and a 2D image content is determined to be started based on the PMT received prior to the 2D image content.

5. A non-transitory computer readable recording medium having embodied thereon a computer program for executing the method of reproducing 3D image content, the method comprising:
   extracting a Program Map Table (PMT) from a header of a Transport Stream (TS);
   determining whether image content included in the TS is 3D image content by using content type information inserted into a descriptor region of the PMT; and
   extracting first information about the 3D image content indicating whether the 3D image content is reference view image content or additional view image content from the PMT,
   wherein the 3D image content is determined to be ended and a 2D image content is determined to be started based on the PMT received prior to the 2D image content.

6. The method of claim 1, wherein if the content type information in the descriptor region of the PMT has a value of 0x01 or 0x10, the image content included in the TS is determined to include 3D image content.

7. A method of providing a video content service, the method comprising:
   generating at least one of elementary stream (ES) comprising a 2-dimensional (2D) video content or a 3-dimensional (3D) video content;
   generating a Program Map Table (PMT) comprising content type information indicating whether the TS comprises the 2D video content or the 3D video content, and first information about the 3D image content indicating whether the 3D image content is reference view image content or additional view image content; and
   transmitting a transport stream (TS) generated by multiplexing the ES and the PMT,
   wherein a PMT for notifying that the 3D video content is to be ended and a 2D video content is to be started is transmitted prior to the 2D video content.

* * * * *